(12) United States Patent
Nakado et al.

(10) Patent No.: US 11,247,752 B2
(45) Date of Patent: Feb. 15, 2022

(54) DOUBLE-SHELL TANK AND SHIP (71) Applicant: KAWASAKI JUKOGYO KABUSHIKI KAISHA, Kobe (JP)

(72) Inventors: Hiroki Nakado, Kakogawa (JP); Masashi Shingo, Uji (JP); Kazuto Gokan, Kobe (JP); Ryosuke Uraguchi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 43 days.

(21) Appl. No.: 16/756,794

(22) PCT Filed: Oct. 9, 2018

(86) PCT No.: PCT/JP2018/037525
§ 371 (c)(1),
(2) Date: Apr. 16, 2020

(87) PCT Pub. No.: WO2019/078048
PCT Pub. Date: Apr. 25, 2019

(65) Prior Publication Data
US 2020/0239110 A1 Jul. 30, 2020

(30) Foreign Application Priority Data

Oct. 16, 2017 (JP) .............................. JP2017-200327

(51) Int. Cl.
| | |
|---|---|
| *F17C 3/08* | (2006.01) |
| *B63B 25/16* | (2006.01) |
| *B65D 90/06* | (2006.01) |
| *F17C 3/04* | (2006.01) |

(52) U.S. Cl.
CPC .............. *B63B 25/16* (2013.01); *B65D 90/06* (2013.01); *F17C 3/04* (2013.01); *F17C 3/08* (2013.01)

(58) Field of Classification Search
CPC .... B65D 90/06; F17C 3/08; F17C 2203/0391; F17C 2270/0105; F17C 2203/0639; F17C 3/04; F17C 11/00
See application file for complete search history.

(56) References Cited

U.S. PATENT DOCUMENTS

| | | | |
|---|---|---|---|
| 2,834,187 A | 5/1958 | Loveday | |
| 2,900,800 A * | 8/1959 | Loveday | .................. F17C 3/08 62/45.1 |
| 3,122,004 A | 2/1964 | Aberle et al. | |
| 3,698,589 A | 10/1972 | Perry | |

(Continued)

FOREIGN PATENT DOCUMENTS

| | | |
|---|---|---|
| DE | 696 17 218 T2 | 11/2002 |
| FR | 1318320 A | 2/1963 |

(Continued)

Primary Examiner — Stephen J Castellano
(74) Attorney, Agent, or Firm — Oliff PLC (57) ABSTRACT

A double-shell tank includes: an inner shell storing liquefied gas; an outer shell surrounding the inner shell, the outer shell forming a vacuum space between the inner shell and the outer shell; at least one metal sheet mounted to the inner shell, such that the metal sheet faces at least a bottom surface of the inner shell; an adsorbent placed on the metal sheet, the adsorbent adsorbing gas molecules by physisorption; and a thermal insulator covering the inner shell over the metal sheet.

6 Claims, 5 Drawing Sheets

(56) References Cited

U.S. PATENT DOCUMENTS

| | | |
|---|---|---|
| 4,055,268 A | 10/1977 | Barthel |
| 4,154,364 A * | 5/1979 | Hagiwara ............. C01B 3/0057 |
| | | 220/560.12 |
| 4,394,929 A | 7/1983 | Patel et al. |
| 4,704,068 A | 11/1987 | Theißen et al. |
| 5,726,908 A | 3/1998 | Hosmer et al. |
| 6,708,502 B1 | 3/2004 | Aceves et al. |
| 2011/0011329 A1* | 1/2011 | Kim ........................ B63B 27/24 |
| | | 114/74 R |
| 2017/0198863 A1 | 7/2017 | Hirai |

FOREIGN PATENT DOCUMENTS

| | | |
|---|---|---|
| JP | S61-206900 A | 9/1986 |
| JP | S63-318398 A | 12/1988 |
| JP | 2006-500536 A | 1/2006 |
| WO | 2004/029503 A2 | 4/2004 |

\* cited by examiner

DOUBLE-SHELL TANK AND SHIP

This application is the national stage (Rule 371) of international application No. PCT/JP2018/037525 filed 9 Oct. 2018.

TECHNICAL FIELD

The present invention relates to a vacuum double-shell tank and a ship including the double-shell tank.

BACKGROUND ART

Conventionally, there is a known double-shell tank including an inner shell and an outer shell. The inner shell stores liquefied gas, and the outer shell surrounds the inner shell. A vacuum space is formed between the inner shell and the outer shell.

For example, Patent Literature 1 discloses a double-shell tank in which a plurality of thermal insulation films are laminated on the inner shell, and an adsorbent is interposed between the thermal insulation films. The adsorbent is a granular material, and is melt-fused to the surface of the thermal insulation films.

In the case of the double-shell tank disclosed by Patent Literature 1, when a vacuum is drawn on the vacuum space, gases such as nitrogen, oxygen, and water vapor are released from, for example, the material surfaces of the thermal insulation films, the inner shell, and the outer shell. However, when a low-temperature material is injected into the inner shell, the thermal insulation films are cooled, and thereby the adsorption ability of the adsorbent increases. Accordingly, the adsorbent adsorbs the aforementioned released gases. An adsorbent whose adsorption ability increases owing to such cooling is considered to be an adsorbent that adsorbs gas molecules by physisorption. It should be noted that physisorption is a phenomenon in which gas molecules are concentrated on a fixed surface (the adsorbent) by van der Waals force.

Figure 2:
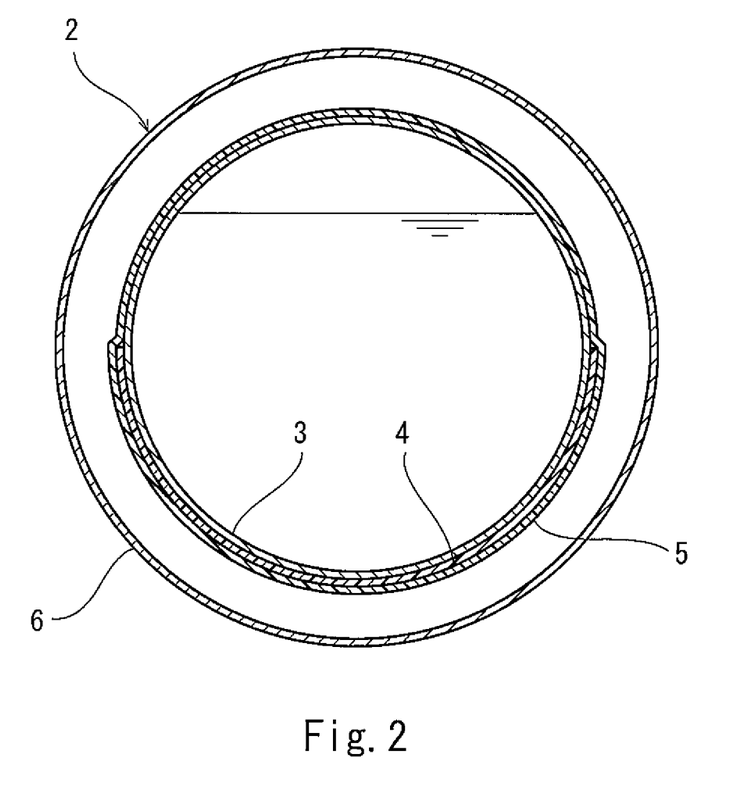
FIG. 2 is a sectional view of the double-shell tank taken along line II-II of FIG. 1.

FIG. 2 of Patent Literature 2 shows a double-shell tank including an inner shell and an outer shell, between which a vacuum space is formed. A getter material is disposed along the top surface and the bottom surface of the inner shell. Patent Literature 2 uses the getter material for adsorbing permeated hydrogen. The getter material adsorbs gas molecules by chemisorption (it is assumed that, in Patent Literature 2, hydrogen molecules are converted into water molecules by the getter material).

CITATION LIST

Patent Literature

PTL 1: Japanese Laid-Open Patent Application Publication No. S63-318398
PTL 2: Japanese National Phase PCT Laid-Open Application Publication No. 2006-500536

SUMMARY OF INVENTION

Technical Problem

However, the double-shell tank disclosed by Patent Literature 1 requires the work of melt-fusing the adsorbent to the thermal insulation films. This results in high cost. In addition, since the adsorbent is interposed between the thermal insulation films, the adsorbent is not cooled to the temperature of the inner shell due to the influence of temperature gradient within the thermal insulation films in the thickness direction. Thus, there is still room for improvement in terms of increase in adsorption ability.

Also inside the inner shell, thermal stratification is formed due to the temperature dependency of the liquefied gas density. Accordingly, the deeper the depth, the lower the temperature of the liquefied gas. That is, among the temperatures of various portions of the outer surface of the inner shell, the temperature of the bottom surface of the inner shell is the lowest. Therefore, it is conceivable to cool the adsorbent to the temperature of the bottom surface of the inner shell by bringing the adsorbent into close contact with the bottom surface of the inner shell. However, on the lower part of the inner shell, gravitational force that causes the adsorbent to detach from the inner shell is exerted on the adsorbent. For this reason, it is difficult to bring the adsorbent into close contact with the bottom surface of the inner shell.

In view of the above, an object of the present invention is to provide a double-shell tank that makes it possible to cool the adsorbent to the temperature of the bottom surface of the inner shell at low cost, and a ship including the double-shell tank.

Solution to Problem

In order to solve the above-described problems, a double-shell tank according to the present invention includes: an inner shell storing liquefied gas; an outer shell surrounding the inner shell, the outer shell forming a vacuum space between the inner shell and the outer shell; at least one metal sheet mounted to the inner shell, such that at least part of the metal sheet faces a bottom surface of the inner shell; an adsorbent placed on the metal sheet, the adsorbent adsorbing gas molecules by physisorption; and a thermal insulator covering the inner shell and the metal sheet.

According to the above configuration, the metal sheet having high thermal conductivity is mounted to the inner shell, such that at least part of the metal sheet faces the bottom surface of the inner shell, and the metal sheet together with the inner shell is covered by the thermal insulator. Accordingly, when the liquefied gas is injected into the inner shell, the metal sheet is cooled to the same temperature as the temperature of the bottom surface of the inner shell. Since the adsorbent is placed on the metal sheet, the adsorbent can be cooled to the temperature of the bottom surface of the inner shell. In addition, since the adsorbent is only required to be placed on the metal sheet, the advantageous effect can be obtained at low cost.

A material of the metal sheet may be the same as a material of the inner shell. According to this configuration, when the liquefied gas is injected into the inner shell, although the inner shell thermally contracts, the metal sheet also thermally contracts with a linear expansion coefficient that is the same as a linear expansion coefficient with which the inner shell thermally contracts. Therefore, when the inner shell thermally contracts, positional deviation between the inner shell and the metal sheet relative to each other can be prevented.

A plurality of stud bolts may be provided on the inner shell. The thermal insulator may include a plurality of thermal insulation sheets. The plurality of stud bolts may be used for fixing the metal sheet and the plurality of thermal insulation sheets. According to this configuration, both the metal sheet and the thermal insulation sheets can be fixed by the shared stud bolts. This makes it possible to simplify the structure.

The at least one metal sheet may include a plurality of metal sheets. End portions of the metal sheets that are adjacent to each other may overlap each other, and stud bolts provided on the inner shell may penetrate the overlapping portions. According to this configuration, the number of stud bolts can be made as small as possible.

The adsorbent may be a porous granular or powdery material enclosed in a bag, and a plurality of openings may be formed in the metal sheet. According to this configuration, gas molecules can collide with the adsorbent through the openings of the metal sheet.

A ship according to the present invention includes the above double-shell tank.

Advantageous Effects of Invention

The present invention makes it possible to cool the adsorbent to the temperature of the bottom surface of the inner shell at low cost.

DESCRIPTION OF EMBODIMENTS

Figure 1:
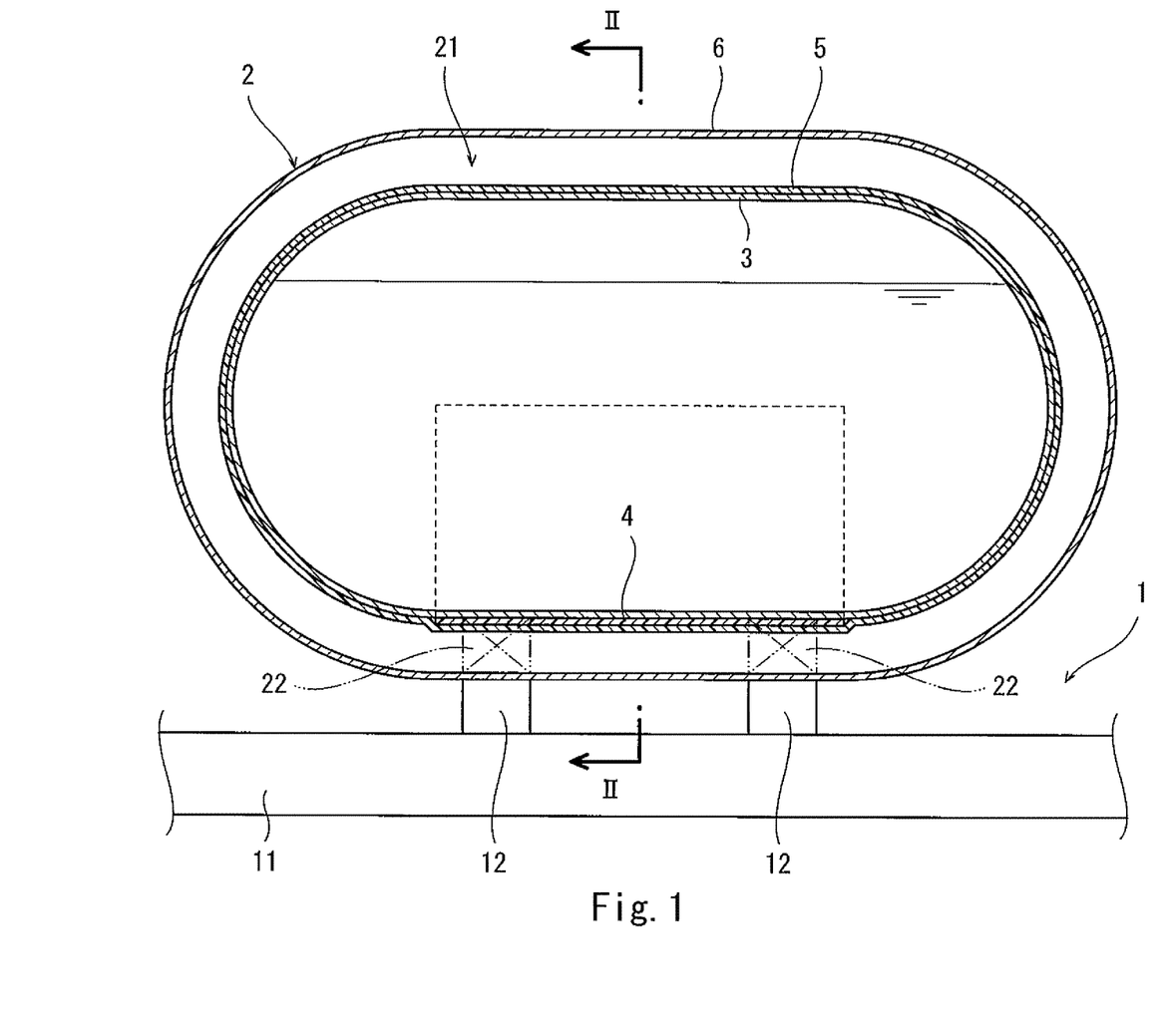
FIG. 1 is a sectional view of part of a ship on which a double-shell tank according to one embodiment of the present invention is installed.

FIG. 1 shows part of a ship 1, on which a double-shell tank 2 according to one embodiment of the present invention is installed.

In the present embodiment, the double-shell tank 2 is a cylindrical tank whose axial direction is parallel to the ship length direction. However, the double-shell tank 2 is not limited to such a shape, but may be, for example, spherical, cuboidal, or rectangular parallelepiped.

The double-shell tank 2 includes an inner shell 3 storing liquefied gas and an outer shell 6 surrounding the inner shell 3. A vacuum space 21 is formed between the inner shell 3 and the outer shell 6. For example, the liquefied gas is liquefied petroleum gas (LPG about −45° C.), liquefied ethylene gas (LEG, about −100° C.), liquefied natural gas (LNG, about −160° C.), liquefied oxygen ($LO_2$, about −180° C.), liquefied hydrogen ($LH_2$, about −250° C.), or liquefied helium (LHe, about −270° C.).

As shown in FIG. 1 and FIG. 2, each of the inner shell 3 and the outer shell 6 is constituted by a body portion and hemispherical sealing portions. The body portion extends laterally with a constant cross-sectional shape. The hemispherical sealing portions seal openings on both sides of the body portion. Alternatively, each sealing portion may have a flat shape perpendicular to the body portion, or may be dish-shaped. The center line of the body portion of the outer shell 6 substantially coincides with the center line of the body portion of the inner shell 3. The diameter of the body portion of the outer shell 6 is greater than the diameter of the inner shell 3.

The outer shell 6 is supported by a pair of saddles 12 provided on a ship bottom 11 at positions that are spaced apart from each other in the axial direction of the double-shell tank 2. A pair of support members 22, which supports the inner shell 3 at the same positions as the saddles 12, is disposed between the inner shell 3 and the outer shell 6.

In the vacuum space 21, the entire inner shell 3 is covered by a thermal insulator 5. In the present embodiment, the thermal insulator 5 is constituted by a plurality of thermal insulation sheets. However, in the drawings, the illustration of divisions between the thermal insulation sheets is omitted. The thermal insulation sheets are arranged along the outer surface of the inner shell 3 without gaps between the sheets. The thermal insulation sheets may form a single layer, or may be laminated together in the thickness direction to form a plurality of layers.

Each thermal insulation sheet has a multi-layered laminated structure. Specifically, each thermal insulation sheet includes radiation shield films and spacers that are stacked alternately. As one example, each radiation shield film may be aluminum foil, or may be a film obtained by vapor-depositing aluminum (or gold or silver) onto the surface of a resin sheet. Each spacer is a sheet having low thermal conductivity. For example, a resin net, woven fabric, non-woven fabric, paper, or a glass fiber material can be used as the sheet. Alternatively, each thermal insulation sheet may be made of glass wool.

In the present embodiment, an adsorbent 4 is disposed between the inner shell 3 and the thermal insulator 5. The adsorbent 4 adsorbs gas molecules by physisorption. When a vacuum is drawn on the vacuum space 21, gases such as nitrogen, oxygen, and water vapor are released from, for example, the material surfaces of the thermal insulator 5, the inner shell 3, and the outer shell 6. The adsorbent 4 serves to keep the degree of vacuum of the vacuum space 21 by adsorbing the gases released from, for example, the material surfaces of the thermal insulator 5, the inner shell 3, and the outer shell 6.

Figure 3:
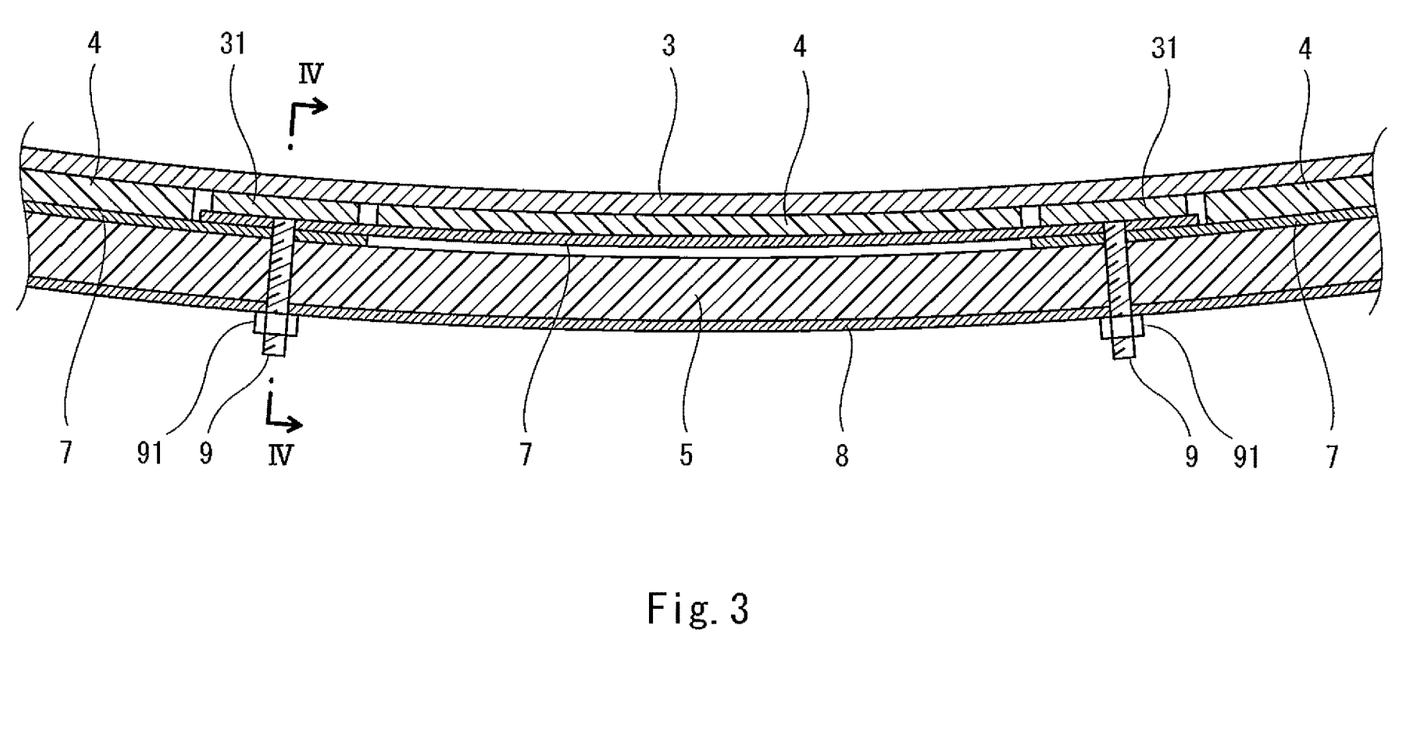
FIG. 3 is an enlarged view of part of FIG. 2.
Figure 4:
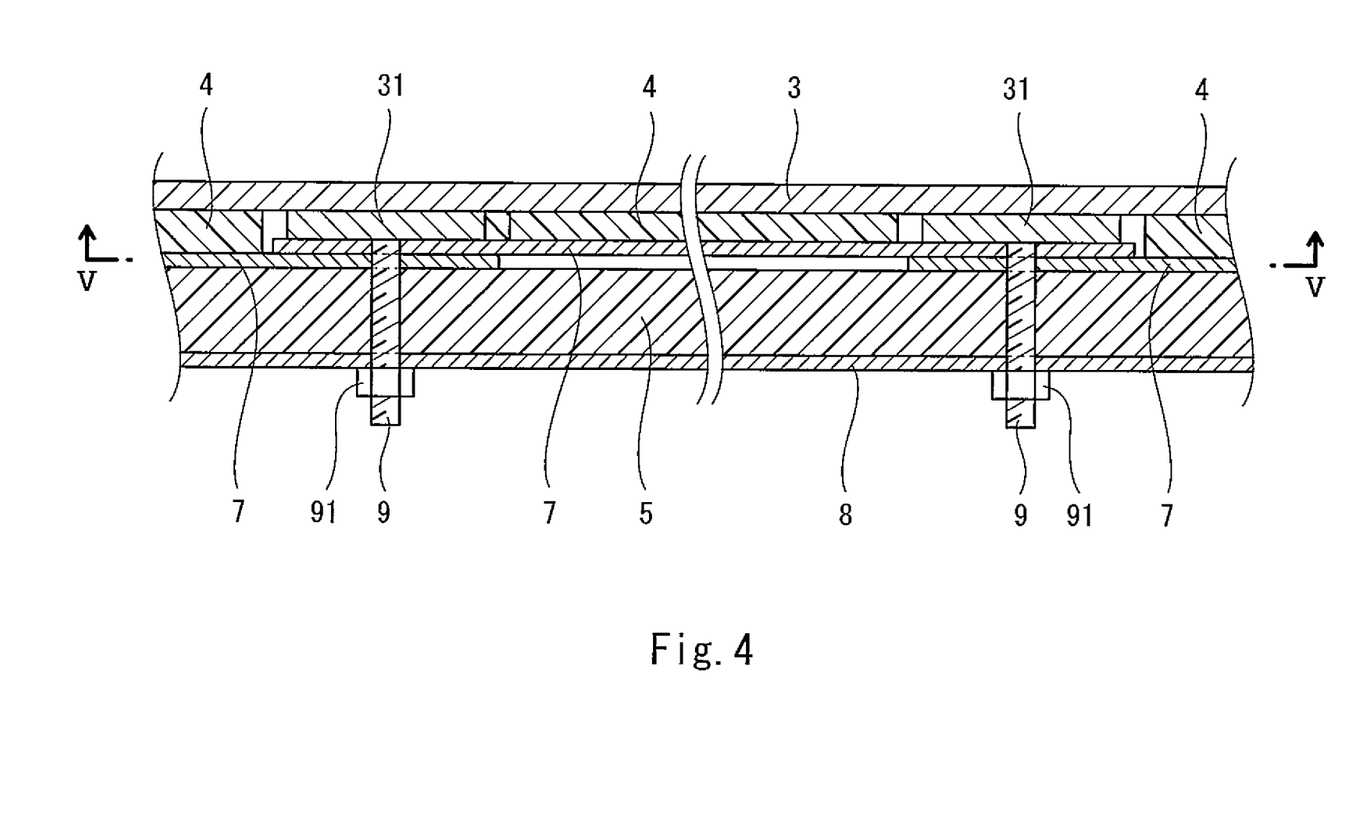
FIG. 4 is a sectional view taken along line IV-IV of FIG. 3.

As shown in FIG. 3 and FIG. 4, the adsorbent 4 is placed on at least one metal sheet 7 (in FIG. 1 and FIG. 2, the illustration of the metal sheet 7 is omitted for the sake of simplifying the drawings). The at least one metal sheet 7 is mounted to the inner shell 3, such that at least part of the metal sheet 7 faces the bottom surface of the inner shell 3. The aforementioned thermal insulator 5 covers the inner shell 3 and the metal sheet 7.

The term "bottom surface" herein refers to a particular region of the outer surface of the inner shell 3. The lowest point of the outer surface is the center of the region, and in the region, an angle formed between the normal line to the outer surface and the vertically downward direction is less than or equal to 45 degrees. In the present embodiment, the double-shell tank 2 is a cylindrical tank. Accordingly, the cross section of the bottom surface has a 90-degree arc shape, whereas the longitudinal section of the bottom surface has such a shape that a straight portion is present between 45-degree arcs. In a case where the double-shell tank 2 is a spherical tank, the sectional shape of the bottom surface is a 90-degree arc in any direction.

The above expression "the at least one metal sheet 7 is . . . such that at least part of the metal sheet 7 faces the bottom surface of the inner shell 3" means that at least part of the at least one metal sheet 7 is present within such a positional range that the part of the at least one metal sheet 7 overlaps the bottom surface of the inner shell 3. Desirably, all the metal sheets 7 are present within such a positional range that all the metal sheets 7 overlap the bottom surface of the inner shell 3. More desirably, the at least one metal sheet 7 covers at least the lowest point of the bottom surface of the inner shell 3.

In the present embodiment, as shown in FIG. 1 and FIG. 2, the adsorbent 4 is disposed along the lower half of the body portion of the inner shell 3. Accordingly, similar to the adsorbent 4, a plurality of metal sheets 7 are disposed in a manner to face the lower half of the outer peripheral surface of the body portion of the inner shell 3.

The material of each metal sheet 7 is the same as the material of the inner shell 3. For example, the material of the inner shell 3 and the metal sheet 7 is stainless steel, Ni-based alloy, or aluminum alloy.

Figure 5:
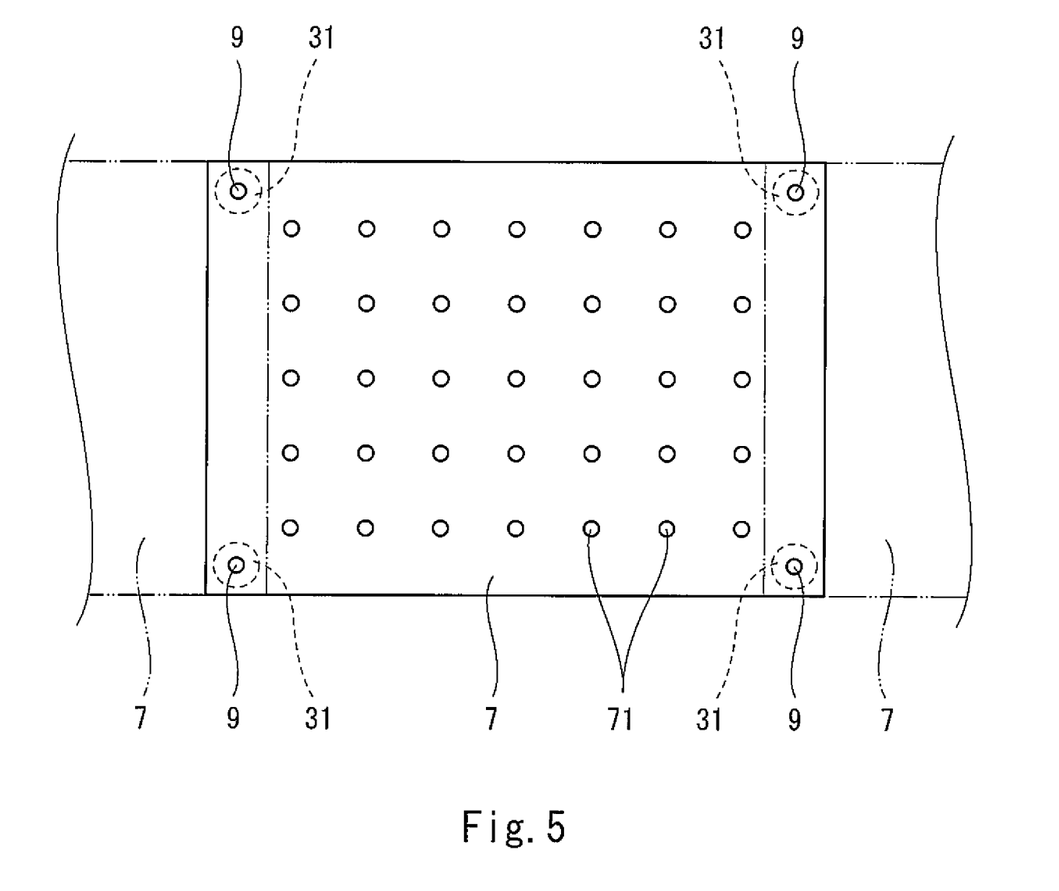
FIG. 5 is a bottom view as seen from line V-V of FIG. 4.

In the present embodiment, each metal sheet 7 is rectangular as shown in FIG. 5. End portions of adjacent metal sheets 7 overlap each other. Stud bolts 9 are provided on the inner shell 3 at positions corresponding to the four corners of each metal sheet 7. The stud bolts 9 penetrate the overlapping portions of the adjacent metal sheets 7.

It should be noted that the stud bolts 9 may penetrate the thermal insulation sheets that constitute the thermal insulator 5. Alternatively, the thermal insulation sheets may be disposed adjacent to each other with stud bolts 9 positioned therebetween, and each of these stud bolts 9 may protrude from a gap between the thermal insulation sheets.

Each stud bolt 9 is provided on the inner shell 3 via a metal base plate 31. The stud bolt 9 is joined to the base plate 31, for example, by a screwing structure or welding. The base plate 31 is joined to the inner shell 3, for example, by welding. In the illustrated example, the base plate 31 has a circular shape. Alternatively, the base plate 31 may have a square shape.

Although the material of the stud bolt 9 is not particularly limited, for example, desirably, the stud bolt 9 is made of a material whose thermal conductivity is low, such as glass fiber reinforced plastic (GFRP).

Each metal sheet 7 is in surface contact with the base plates 31. For this reason, high thermal conductivity between the inner shell 3 and the metal sheet 7 is obtained. Each base plate 31 also functions as a spacer that forms a gap between the metal sheet 7 and the inner shell 3.

In the present embodiment, a plurality of openings 71 (see FIG. 5) are formed in each metal sheet 7. Accordingly, gas molecules can collide with the adsorbent 4 through the openings 71 of the metal sheet 7. The openings 71 may be through-holes drilled in the metal plate. Alternatively, each metal sheet 7 may be an expanded metal in which diamond-shaped openings 71 are arranged in a staggered manner. However, since the gas molecules in the vacuum space 21 can enter from around the metal sheet 7 toward the adsorbent 4 along the outer surface of the inner shell 3, the metal sheet 7 may be a metal plate without the openings 71.

The above adsorbent 4 is a porous granular or powdery material enclosed in a bag. The bag enclosing the adsorbent 4 therein is fixed to the metal sheet 7 by rivets. For example, activated carbon, zeolite, silica gel, or alumina can be used as the adsorbent 4.

A keep plate 8 is disposed on the outside of the thermal insulator 5. The keep plate 8 is fixed to the aforementioned stud bolts 9 by nuts 91, and retains the metal sheets 7 and the thermal insulation sheets constituting the thermal insulator 5. Specifically, the stud bolts 9 are used to fix the metal sheets 7 and the thermal insulation sheets, and the keep plate 8 presses the thermal insulator 5 and the metal sheets 7 onto the base plates 31. For example, the keep plate 8 is constituted by a plurality of bar-shaped members, each of which extends between adjacent stud bolts 9 in a bridging manner.

As described above, in the double-shell tank 2 of the present embodiment, the metal sheet 7 having high thermal conductivity is mounted to the inner shell 3, such that at least part of the metal sheet 7 faces the bottom surface of the inner shell 3, and the metal sheet 7 together with the inner shell 3 is covered by the thermal insulator 5. Accordingly, when the liquefied gas is injected into the inner shell 3, the metal sheet 7 is cooled to the same temperature as the temperature of the bottom surface of the inner shell 3. Since the adsorbent 4 is placed on the metal sheet 7, the adsorbent 4 can be cooled to the temperature of the bottom surface of the inner shell 3. In addition, since the adsorbent 4 is only required to be placed on the metal sheet 7, the advantageous effect can be obtained at low cost.

When the liquefied gas is taken out of the double-shell tank 2, the liquefied gas remains in the lower part of the double-shell tank 2 until the double-shell tank 2 becomes empty. Thus, the adsorbent 4 can be cooled and a high degree of vacuum can be kept until immediately before the double-shell tank 2 becomes empty.

Further, in the present embodiment, since the stud bolts 9 are used for fixing the metal sheets 7 and the thermal insulation sheets, both the metal sheets 7 and the thermal insulation sheets can be fixed by the shared stud bolts 9. This makes it possible to simplify the structure.

(Variations)

The present invention is not limited to the above-described embodiment. Various modifications can be made without departing from the scope of the present invention.

For example, the material of the metal sheet 7 may be different from the material of the inner shell 3. However, in a case where the material of the metal sheet 7 is the same as the material of the inner shell 3 as in the above-described embodiment, when the liquefied gas is injected into the inner shell 3, although the inner shell 3 thermally contracts, the metal sheet 7 also thermally contracts with a linear expansion coefficient that is the same as a linear expansion coefficient with which the inner shell 3 thermally contracts. Therefore, when the inner shell 3 thermally contracts, positional deviation between the inner shell 3 and the metal sheet 7 relative to each other can be prevented.

Instead of providing the base plates 31, end portions of the metal sheet 7 may be thickened, and the stud bolts 9 may be directly joined to the inner shell 3.

In the case of using the plurality of metal sheets 7, it is not essential that end portions of adjacent metal sheets 7 overlap each other. However, if the end portions of the adjacent metal sheets 7 overlap each other and the stud bolts 9 penetrate the overlapping portions as in the present embodiment, the number of stud bolts 9 can be made as small as possible.

It is not essential that the thermal insulator 5 be constituted by the thermal insulation sheets. For example, the thermal insulator 5 may be a granular material (e.g., pearlite) or glass wool that fills between the inner shell 3 and the outer shell 6. Alternatively, the thermal insulator 5 may be made of urethane foam. However, in the vacuum space, the thermal insulation sheets having the laminated structure as described in the above embodiment exert much higher thermal insulation performance than pearlite, glass wool, and urethane foam. Therefore, the present invention is particularly useful in a case where the thermal insulator 5 includes a plurality of thermal insulation sheets intended for use in a vacuum space.

The present invention is applicable not only to a tank installed on a ship, but also to a tank set on the ground. However, in the ship, sloshing occurs in the inner shell 3 due to rolling and/or pitching of the hull. Even though such sloshing occurs, since the metal sheet 7 and the inner shell 3 are mechanically fastened together by the stud bolts 9, and also, the metal sheet 7 and the adsorbent 4 are fixed together by the rivets, the adsorbent 4 can be disposed stably even under such a swinging condition. Therefore, the configuration of the above-described embodiment is particularly useful for a tank installed on a ship.

REFERENCE SIGNS LIST

1 ship
2 double-shell tank
21 vacuum space
3 inner shell
4 adsorbent
5 thermal insulator
6 outer shell
7 metal sheet
8 keep plate
9 stud bolt

The invention claimed is:

1. A double-shell tank comprising:
an inner shell storing liquefied gas;
an outer shell surrounding the inner shell, the outer shell forming a vacuum space between the inner shell and the outer shell;
at least one metal sheet mounted to the inner shell, such that at least part of the metal sheet faces a bottom surface of the inner shell;
an adsorbent placed on the metal sheet, the adsorbent adsorbing gas molecules by physisorption; and
a thermal insulator covering the inner shell and the metal sheet; wherein
the adsorbent is a porous granular or powdery material enclosed in a bag, and
a plurality of openings are formed in the metal sheet.

2. A ship comprising the double-shell tank according to claim 1.

3. A double-shell tank comprising:
an inner shell storing liquefied gas;
an outer shell surrounding the inner shell, the outer shell forming a vacuum space between the inner shell and the outer shell;
at least one metal sheet mounted to the inner shell, such that at least part of the metal sheet faces a bottom surface of the inner shell;
an adsorbent placed on the metal sheet, the adsorbent adsorbing gas molecules by physisorption; and
a thermal insulator covering the inner shell and the metal sheet; wherein
the at least one metal sheet includes a plurality of metal sheets, and
end portions of the metal sheets that are adjacent to each other overlap each other, and stud bolts provided on the inner shell penetrate the overlapping portions.

4. A ship comprising the double-shell tank according to claim 3.

5. A double-shell tank comprising:
an inner shell storing liquefied gas;
an outer shell surrounding the inner shell, the outer shell forming a vacuum space between the inner shell and the outer shell;
at least one metal sheet mounted to the inner shell, such that at least part of the metal sheet faces a bottom surface of the inner shell;
an adsorbent placed on the metal sheet, the adsorbent adsorbing gas molecules by physisorption; and
a thermal insulator covering the inner shell and the metal sheet; wherein
a plurality of stud bolts are provided on the inner shell,
the thermal insulator includes a plurality of thermal insulation sheets, and
the plurality of stud bolts are used for fixing the metal sheet and the plurality of thermal insulation sheets.

6. A ship comprising the double-shell tank according to claim 5.

* * * * *